United States Patent [19]

Brewer

[11] 4,024,608
[45] May 24, 1977

[54] FUNCTION-SEPARATING CONNECTOR

[76] Inventor: Robert A. Brewer, 15 Castle Park Way, Oakland, Calif. 94611

[22] Filed: Mar. 15, 1976

[21] Appl. No.: 666,883

[52] U.S. Cl. .............................. 24/236; 24/73 HR; 24/231; 24/265 H; 224/5 V
[51] Int. Cl.² ......................................... A44B 13/02
[58] Field of Search .......... 24/73 HH, 73 HR, 236, 24/237, 129 D, 231, 265 AL, 265 H; 224/5 V; 59/84, 87, 85; 119/106

[56] References Cited

UNITED STATES PATENTS

| | | | |
|---|---|---|---|
| 502,792 | 10/1893 | Vollmar | 24/129 D |
| 603,247 | 5/1898 | Becker | 24/237 |
| 1,559,053 | 10/1925 | Sexauer | 24/237 |
| 2,674,824 | 4/1954 | Werner | 24/129 D |
| 2,694,844 | 11/1954 | Grumbach | 24/236 |
| 2,738,562 | 3/1956 | Sharps | 24/236 |
| 2,756,478 | 7/1956 | Morrissey | 24/237 |
| 3,004,319 | 10/1961 | Hennon | 24/237 |

Primary Examiner—Bernard A. Gelak
Attorney, Agent, or Firm—James R. Cypher

[57] ABSTRACT

A connector consisting of a single elongated element such as a metal wire or plastic member formed in a closed shape with end loops joined by generally straight and generally parallel sides. A sleeve member is removably affixed to the parallel sides. One of the end loops is dimensioned to thread through a carrying lug on an article and the other loop is dimensioned for attachment to a hook connected to a strap or carrying harness.

2 Claims, 20 Drawing Figures

U.S. Patent    May 24, 1977    Sheet 1 of 3    4,024,608
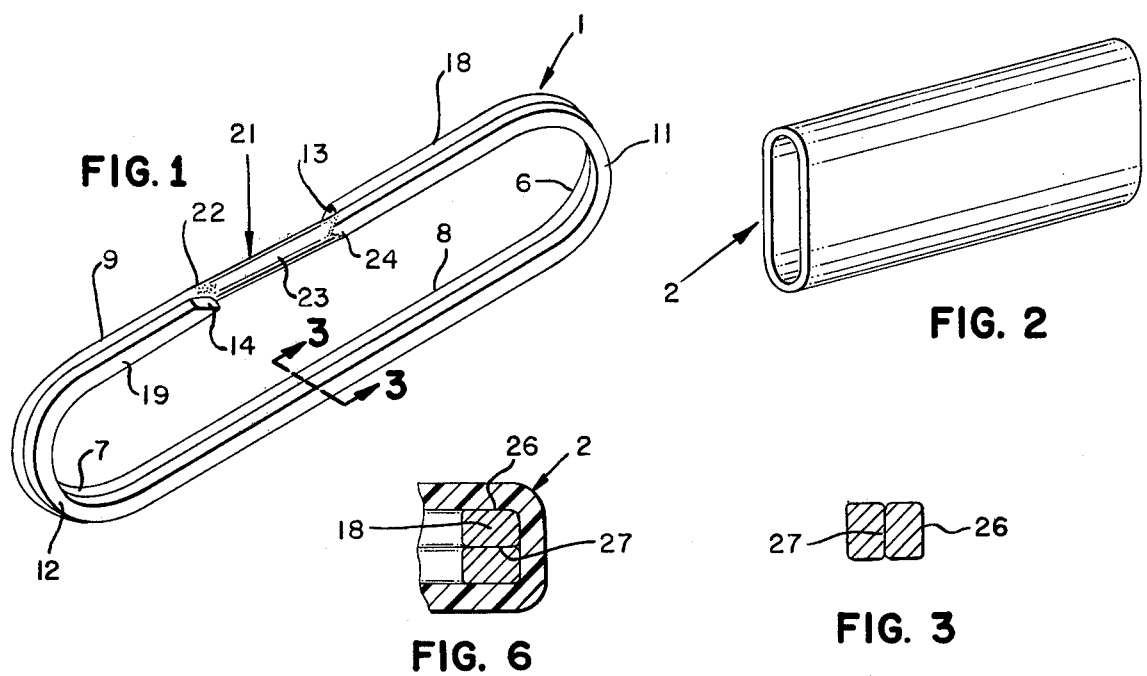
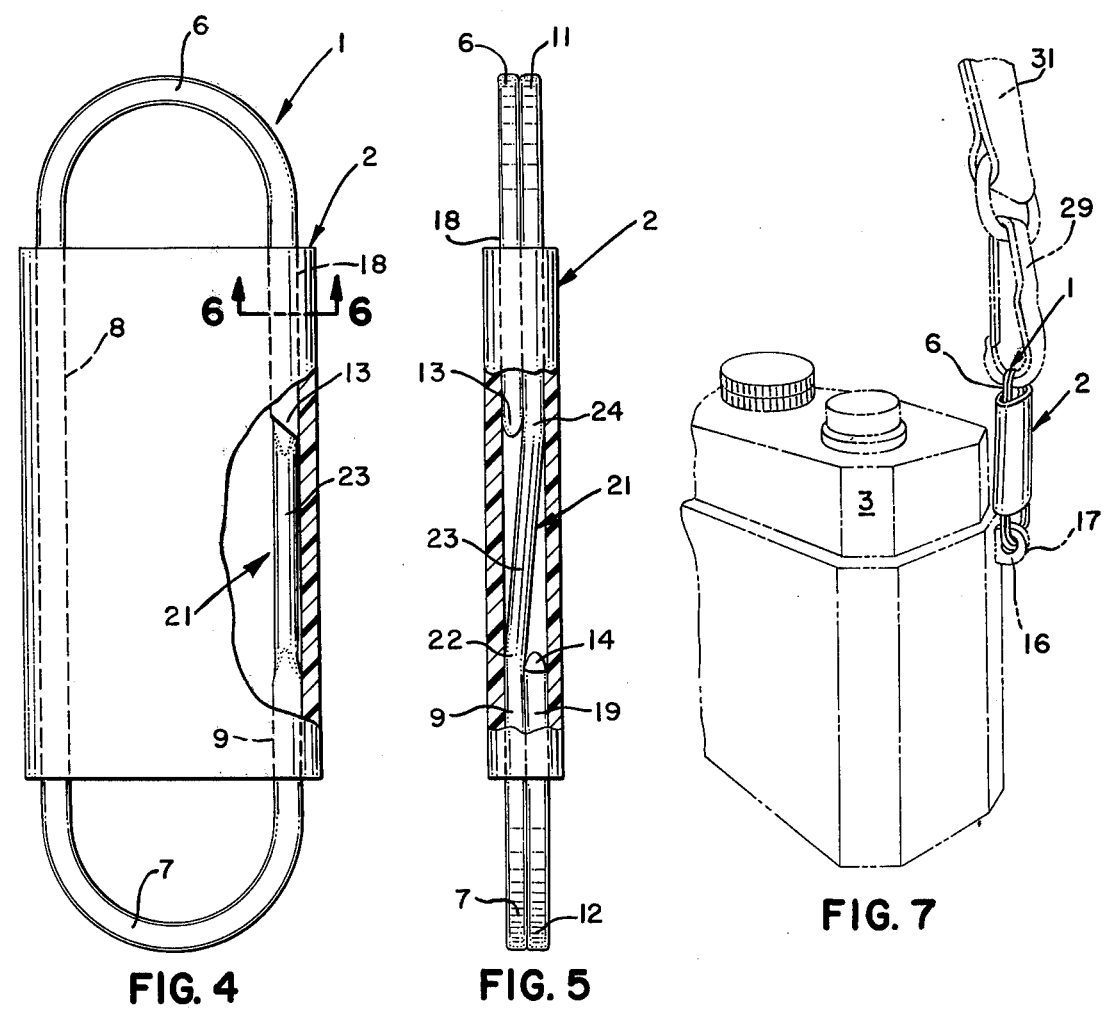

FUNCTION-SEPARATING CONNECTOR

BACKGROUND OF THE INVENTION

Small articles such as cameras, binoculars, portable radios, and some scientific instruments are equipped with small lifting lugs to which neck straps are attached for carrying the article about the neck. It is tiresome to carry these articles about the neck for long periods of time; particuarly if they are heavy. To alleviate this problem, carrying harnesses have been marketed to replace the simple neck strap. (See e.g. Brewer U.S. Pat. No. 3,884,403, Article Carrying Strap; and Kuban U.S. Pat. No. 3,526,347, Harness for Supporting Binoculars and the like.

Since the spring actuated J-hooks of the harnesses are too large to connect to the camera or other article carrying lugs, an intermediate connector such as a split ring (see FIG. 4 of Brewer U.S. Pat. No. 3,884,403) was provided which was small enough in cross section to fit through the carrying lug.

Use of split rings posed two problems. First, most split rings are made of tempered steel wire and cameras have a fine metallic or painted finish. The metal used for the camera body is frequently brass or aluminum which is much softer than steel as is the paint. Due to the placement of strap lugs on the sides of many cameras, the split ring often marred the surface of the camera. Further, split rings are free to rotate in the lug and the sharp ends of the metal provide a further hazard to the finish of the camera or binoculars by scratchng.

When using split rings, it is also possible for the hardware on the carrying harness to rub against the finish of the camera or binoculars and marr or scratch the fine surface.

The second problem in using split rings with expensive and often relatively heavy articles such as cameras, binoculars and radios is the fact that the carrying lugs on such articles are so small that a very light gauge split ring must be used which in some cases is insufficiently strong to carry the article under stress conditions. The split ring, which is merely a coil of wire with a crimp in it, separates under stress conditions and the article is free to slip out of the gap in the split ring.

A further problem with split rings is the fact that due to their circular shape, it is difficult to attach any protective material to them or connect any shield or cover which will separate one end of the ring from the other so that one end of the ring can be separated from the other end of the ring.

SUMMARY OF THE INVENTION

The gist of the present invention is the provision of a connecting device which has generally parallel sides intermediate the end loops and a cover, shield or sleeve that can be slidably or releasably attached to the connector.

An object of the present invention is to provide an intermediate connector which can be attached to the small carrying lugs on articles such as cameras, binoculars, portable radios and many scientific instruments and to carrying harnesses without marring or scratching the finishes of the article.

Another object is to provide a connector which is stronger than comparable split rings.

A further object is to provide a connecting device which provides two distinct connecting areas and prevents the couplers from the respective coupling areas from sliding freely from one area to the other, which can lead to jamming together and damaging of the various parts, as in the case of split rings.

Still another object is to provide a function-separating connector which is inexpensive to manufacture, easy to use and durable.

Another object is to enable a person to use interchangeably other straps and harnesses with cameras and other carried articles.

BRIEF DESCRIPTION OF THE DRAWINGS

FIG. 1 is a perspective view of one of the forms of the connector of the present invention.

FIG. 2 is a perspective view of the sleeve member used in conjunction with the connector of FIG. 1.

FIG. 3 is a cross section taken along the line 3—3 of FIG. 1.

FIG. 4 is a plan view of the connector shown in FIG. 1.

FIG. 5 is a side view of the connector shown in FIG. 1 with portions of the sleeve removed and shown in cross section.

FIG. 6 is a cross section view of a portion of the connector taken generally along line 6—6 of FIG. 4.

FIG. 7 is a perspective view of the connector shown in FIGS. 1–6. For purposes of illustration, a camera and load carrying harness are shown in phantom lines; interconnected by the connector of the present invention.

BRIEF DESCRIPTION OF THE PREFERRED EMBODIMENTS OF THE INVENTION

Figure 8:
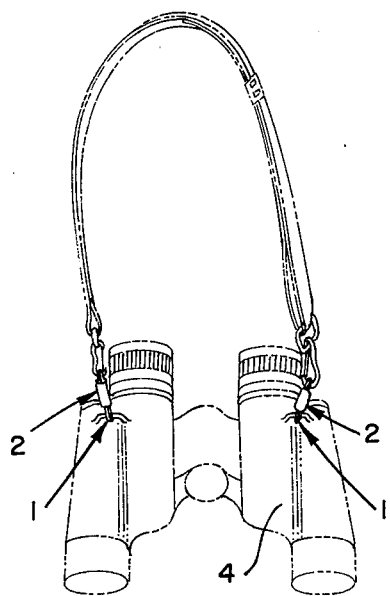
FIG. 8 illustrates another example of the use of the connector of FIGS. 1 through 6. A pair of binoculars and a lead carrying strap are shown in phantom line.

Five forms of the invention are fully described herein. The first form of the invention is illustrated in FIGS. 1 and 2. Basically, the connector consists of a single elongated element 1 and a sleeve member 2. The elongated element is preferably made of metal but can be made from plastic. The elongated element must have sufficient tensile strength to support objects such as cameras 3, binoculars 4, scientific instruments, portable radios and other articles that are carried by straps by a person. Since the element must be inserted and removed from small openings in carrying lugs, the element must have sufficient resiliency to spread apart and then return to its initial shape. The element is shaped or cast so as to have overlapping portions. These overlapping portions are spread apart for attaching purposes and the element is herein characterized as being laterally resilient.

The connector may be bent or cast into various shapes so long as first loop 6 and second loop portions 7 are spaced apart. Preferably, for ease in attaching the sleeve member, the elongated element is formed with parallel generally straight sections 8 and 9.

In order to have sufficient strength to hold the article without springing open, the elongated element is formed so that a double loop overlapping one of the loops is formed at least at one end of this is shown as third loop 11. In the form of the invention shown, an additional loop, or fourth loop 12 overlaps the loop at the other end. It has been found that having only one loop at one end of the connector permits the connector to rotate more freely and it can slide into smaller areas where the connecting lug is very close to the side of the camera or other carried article.

The elongated element has ends 13 and 14 which are unjoined so that the element may be threaded through an opening 16 in a load carrying lug 17. The ends, as shown, terminate in the straight portions 18 and 19 of the connector so as to form continuous sections in the loop ends where the connector attached to the load carrying lugs or carrying hooks.

The elongated element as shown in FIG. 1 is formed generally in one plane and the first end 13 terminates on a first side of the plane and the second end 14 terminates on the opposite face of the plane.

In order to reduce the overall thickness of the connector, loops 6 and 7 are formed on one level and loops 11 and 12 are formed on a second level in touching contact. Portion 21 of the elongated element is formed as an offset, being formed with a bend 22, a straight section 23 and a second bend 24 as shown in the drawings. Ends 13 and 14 terminate approximately at bends 24 and 22 respectively.

In order to even further reduce the total thickness of the connector, the upper face 26 and lower face 27 of the elongated element may be flattened as illustrated. It is unnecessary to flatten the offset portion 21 of the element.

To enhance the appearance of the connector and/or to protect the steel from corrosion, the element may be plated with nickel, cadmium, chromium, zinc, or other metal.

Figure 9:
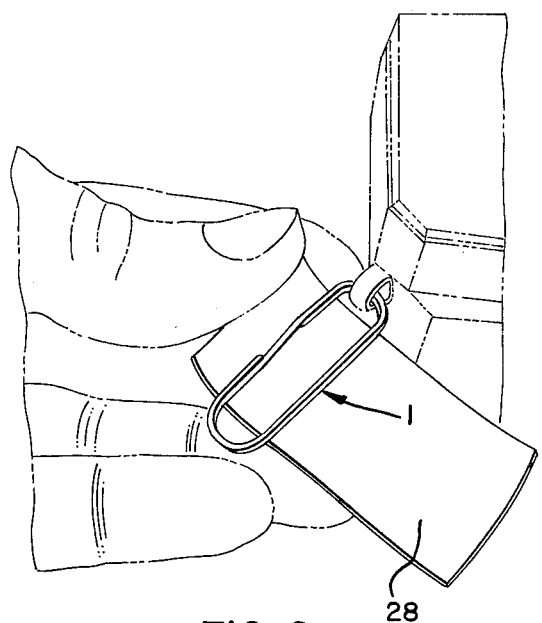
FIG. 9 illustrates the use of the element shown in FIG. 1 with an alternate to the tube element shown in FIG. 2.

The sleeve member used with the elongated element is preferably plastic tape, 28 as shown in FIG. 9 or a plastic extruded tubular member as shown in FIG. 2 or an elastic band. The sleeve covers the parallel sections of the connector and perform several functions. First, the sleeve protects the carried piece of equipment such as the camera or binoculars from abrasion or scratching by the metal portion of the connector or by the sharp ends of the connector which terminate in the straight portion. As shown in FIG. 7, the connector of the present invention connects to lug 17 on the side of the camera. The sleeve 2 prevents the connector from sliding through the lug and the connector can only pivot outwardly from the camera. The sleeve is in contact generally with the metal part of the camera.

When a large hook 29 such as the new one illustrated is used, the hook is confined to the lamp portion 6 of the connector by the sleeve 2. Only when the tension in the strap 31 goes completely slack is it possible for the hook 29 to touch the camera. In such event, there is little possibility of damage to the finish to the camera in contrast in the condition if there was no sleeve and the metal connector was free to rub against the camera.

Preferably the tape or sleeve is constructed from a material which has only limited stretch. The sleeve is dimensioned so that some stretching is required to slip it over the wire or plastic element and the shape of the wire keeps the tube in tension to prevent it from sliding off. The selection of the material with only limited stretch holds the free ends 13 and 14 of the elongated member thereby strengthening the connector and enabling it to hold greater loads. Since the ability of the connector to hold loads is limited, not by the tensile strength of the wire, but by the tendency of the wire to bend, spread and thereby release the article, the use the sleeve greatly enhances the ability of the connector to hold the article. As an added feature of the present connector over circular split rings, the present connector can carry greater loads because the width of the connector is less than a split ring. A circular split ring of the same length has a greater moment arm than the present connector and therefore the present connector has less tendency to deform or fail.

Finally, the sleeve prevents the connector from working off of the carrying lug. When there is no covering or sleeve over the connector, it can sometimes work over the strap lug and by continued vibration and movement, work the connector, such as a split ring, around to the place where the connection is lost.

As shown in the drawing, the offset portion, as shown in FIG. 5 is longer than the offset portion of a standard split ring. The angle formed in the offset portion of the present invention is considerably less than the angle formed in split rings. The smaller angle in the wire results in a stronger connector since the wire need not be "upset" nearly as much.

The fact that the sleeve covers the sharp edges of the ends and the fact that the sleeve holds the ends together makes it possible to separate the ends at a greater distance and thereby eliminate the severe "upsetting" of a metal by a short offset portion with severe angles.

Figure 10:
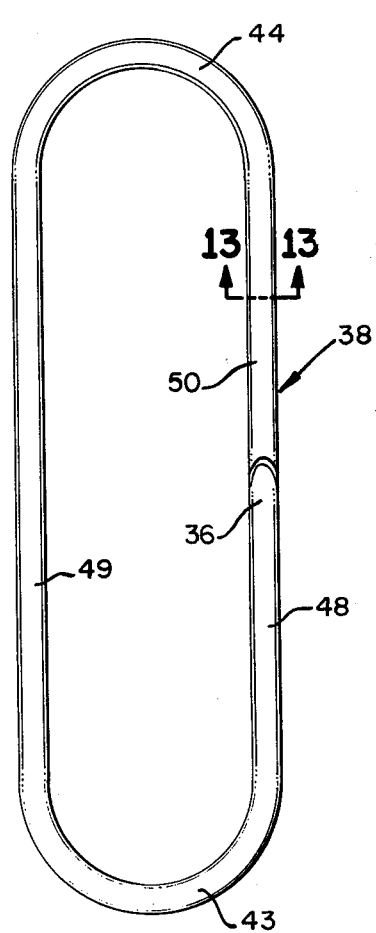
FIG. 10 is a plan view of another form of the invention.
Figure 11:
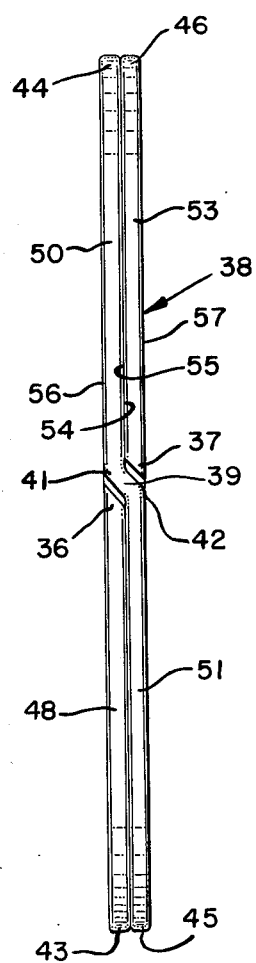
FIG. 11 is a side view of the form of the invention shown in FIG. 10.
Figure 12:
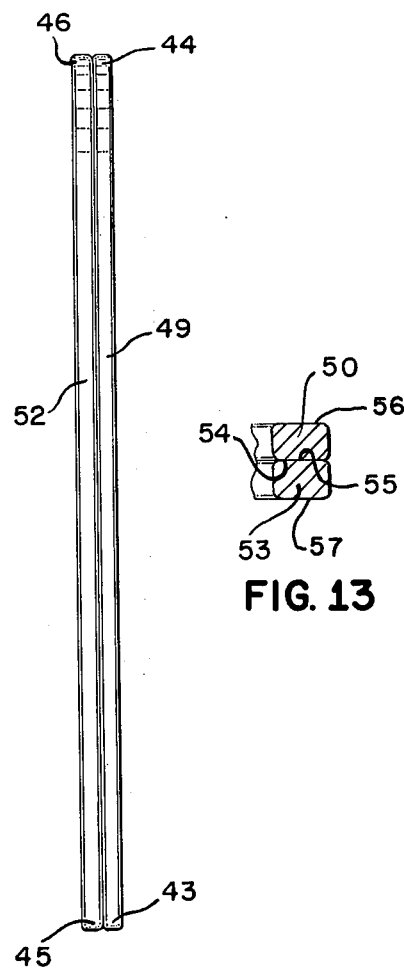
FIG. 12 is a view of the other side of the form of the invention shown in FIG. 10.
Figure 13:
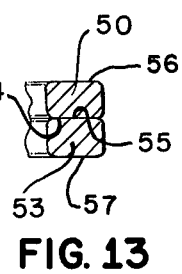
FIG. 13 is a cross section of the device taken along line 13—13 of FIG. 10.

Another form of the invention is shown in FIGS. 10 and 11. In this form of the invention, the connector is the same as previously described, except that the ends 36 and 37 are much closer together. In this form of the invention, the ends are separated by little more than the thickness of the elongated element 38. Thus the offset portion shown as straight section 39 is very short. The member is bent at bend points 41 and 42 and the angles formed at these points are about 45 degrees. This form of the invention would only be used where the metal was heat treated to overcome the effect of "upsetting" the metal or where the connector was made of plastic and it was desired to terminate the ends as closely together as possible.

As previously set forth in the first embodiment of the invention, the connector may be formed with loop portions 43, 44, 45, and 46 with straight portions 48, 49, 50, 51, 52, and 53 joining the loops. The inner faces 54, 55 and outer faces 56 and 57 may be flattened to decrease the overall thickness of the member. Either tape or a plastic sleeve as previously described may be used to envelope the straight portions.

Figure 14:
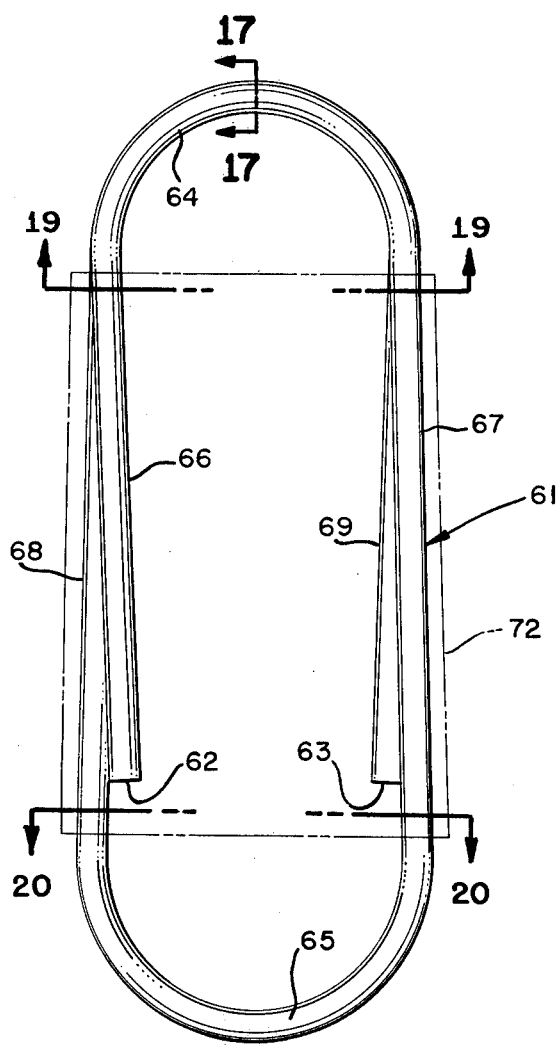
FIG. 14 is a plan view of still another form of the invention.
Figure 15:
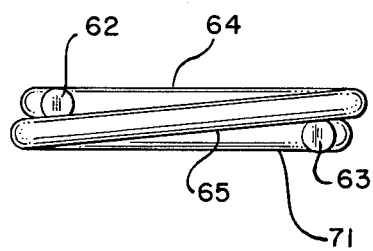
FIG. 15 is an end view of the form of the invention shown in FIG. 14.
Figure 16:
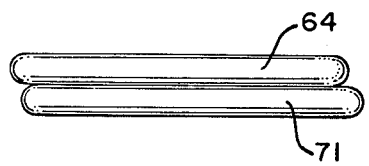
FIG. 16 is the other end of the device shown in FIG. 14.
Figure 17:
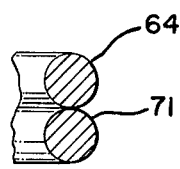
FIG. 17 is a cross section of the device taken along line 17—17 of FIG. 14.
Figure 18:
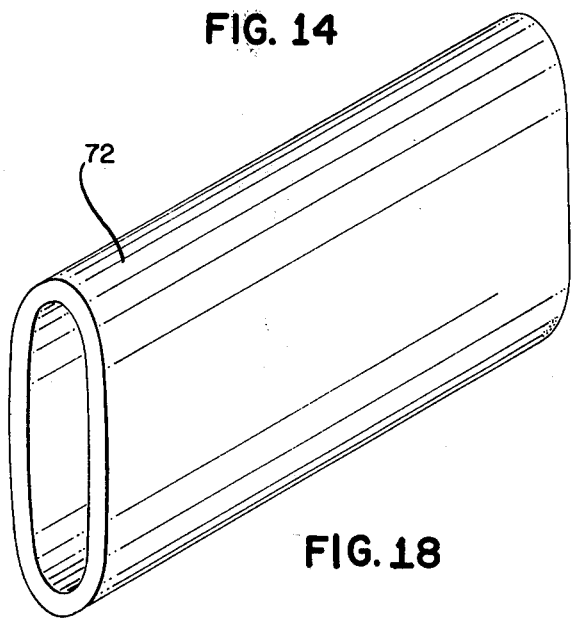
FIG. 18 is a perspective view of a sleeve dimensioned to slide onto the element shown in FIG. 14.
Figure 19:
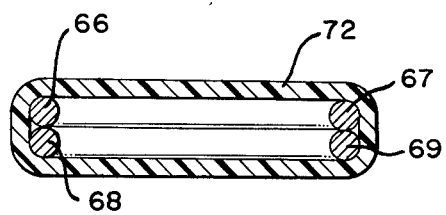
FIG 19 is a cross-sectional view of the device taken along line 19—19 of FIG. 14.
Figure 20:
FIG. 20 is a cross-sectional view of the device taken along line 20—20 of FIG. 14.

Another form of the invention is illustrated in FIGS. 14, 15, and 16. The connector consists of a single elongated laterally-resilient element 61 having unjoined ends 62 and 63 formed in a generally closed shape forming first and second loops 64 and 65 joined by a generally straight and parallel sections 66, 67, 68, and 69. The element has a length such that a double loop 71 is made at one end. The first and second ends terminate in the generally straight section. The connector includes a sleeve member 72 removably affixed to the parallel sections of the element so as to expose the first and second loops for receiving connection means. The sleeve may be a tube made of plastic or a length of adhesive tape wrapped around the element as previously described.

The connector shown in FIGS. 14, 15, and 16 is formed so that the element is formed in a spiral in generally one plane with the first end 62 terminating on a first side of the plane and the second end 63 terminating on the opposite face of the plane. The element is formed so that the portions overlap one another. Preferably the element is formed so that the ends 62 and 63 terminate at points slightly inside the perimeter of the connector so that the ends will not penetrate the tape or sleeve.

The element is preferably constructed from approximately 0.045 inch hard drawn spring wire hardened and tempered after fabrication and finished with fine white-nickel or cadmium plate. The element may be constructed in various sizes. As an example, the element may be approximately 1.5 inch long and 0.545 inch wide. The double loops 64 and 71 in the example have a radius of 0.250 inch measured to the center line of the wire and the single loop has a radius of 0.275 inch. The straight portion may be 1.00 inch in the length with the ends terminating approximately ⅛ inch short of the length of the straight portion. These dimensions result in a connector in which the tension in the cylindrical plastic tube is the same where the tube encompasses one loop (0.545 inch wide) as where the tube encompasses two loops (0.500 inch wide, but twice as thick). Having the same tension in both places prevents the tube from working from the high-tension end to the low-tension end. The sides are not precisely parallel.

Fig. 7 illustrates the connector of the present invention in use for carrying a camera in combination with a carrying harness which has a hook 29 which is too large for connection to the camera lug 17. To attach the connector to the camera, a free end of the element is inserted through the lug and the connector is rotated until both coils of the connector are within the opening of the lug, and the connector may rotate freely. The sleeve or tape is then placed around the straight portion of the element. The tube may be slid onto one end of the element or the tape wrapped around the element. The hook 29 is then inserted through one loop as shown. The connector should be left on the camera or other article so that either a neck strap, harness or other carrying means of the persons choice may be interchangeably used.

I claim:
1. A function separating connector for connecting a camera to a carrying harness comprising:
   a. A single wire having a first and second ends, bent to a configuration lying generally within a single plane and consisting of a mid-portion with generally straight and parallel portions of said wire and a single loop end on one side of said mid-portion and a double loop end on the other side of said mid-portion;
   b. an elongated, non-abrading, parallel sided sleeve member frictionally removably affixed and surrounding said wire and substantially covering said straight mid-portion and said wire ends whereby one loop end is uncovered and is adapted for connection to a camera lug and the sleeve separates the other loop end which is uncovered and adapted for connection to a neckstrap or harness strap hook and the sleeve prevents said hook and wire connector from sratching the surface of a camera;
   c. said wire member consists of:
      1. a first straight member inclined inwardly of said mid-portion and terminating in a first distal end within said mid-portion and adjacent to said single loop end,
      2. a first loop portion connected to said first straight portion bent on a curve of about 180° and forming one of said loops of said double loop end;
      3. a second straight member connected to said first loop portion on a line spaced from said first straight member,
      4. a second loop connected to said second straight member bent on a curve of about 180° and forming said single loop end,
      5. a third straight member connected to said second loop spaced from and on a line convergent to said second straight member in a direction toward said first loop,
      6. a third loop connected to said third straight member generally overlying said first loop member and bent on a curve of about 180°,
      7. a fourth straight member inclined inwardly of said mid-portion and terminating in a second distal end within said mid-portion and adjacent to said single loop end; and
   d. said wire is bent so that said second and third straight members converge slightly in the direction of said double loop end so that the first perimeter distance at the junction of said first and third loops with said straight members is substantially equal to the second perimeter distance at the junction of said second loop with said straight members.
2. A connector as described in claim 1 comprising:
   a. said sleeve member is elastic and has an inside perimeter dimension less than said first and second perimeter distances so that said sleeve when mounted on said connector is in tension.